2,946,830

PREVENTION OF EMULSIONS DURING EXTRACTION WITH ACIDIC CUPROUS SALT SOLUTIONS

Frederick L. Stoller, Barcelona, Venezuela, assignor to Phillips Petroleum Company, a corporation of Delaware No Drawing. Filed Sept. 2, 1958, Ser. No. 758,550

7 Claims. (Cl. 260—677)

This invention relates to the recovery of olefins, particularly diolefins, from hydrocarbon mixtures containing the same with metal salt solutions and is specifically directed to a method of solving the problem of emulsion formation in the separation. In a further aspect, this invention relates to a new absorbent solution.

The separation of olefins and diolefins from mixtures of hydrocarbons containing the same is well known. Among the processes for effecting this separation which are known in the prior art is that of selective absorption of the olefin or diolefin in aqueous cuprous salt solutions and slurries. These absorbents are well known in the prior art and generally are made up of a metal salt such as a cuprous salt, the ammonium salt corresponding to the anion of the metal salt and the acid corresponding to the anion of the metal salt, along with the desired amount of water.

The process is ordinarily carried out by contacting the hydrocarbon mixture in a suitable vessel, such as a stirred contacting vessel, passing the reaction mixture to a settling zone in which the mixture breaks to form a hydrocarbon phase and an aqueous phase, separately removing the two phases, and recovering the absorbed hydrocarbon from the aqueous phase by heating or lowering the pressure. In many instances, the emulsion formed in the mixing vessel is so stable that no more than very incomplete breaking of the emulsion is effected in the settling chamber. In some instances, centrifuging is effective for breaking the emulsion, but this step is very costly to effect.

The following are objects of my invention.

An object of my invention is to provide a new method of separating hydrocarbon mixtures into fractions of different structure.

A further object of my invention is to provide an improved method of separating diolefins from hydrocarbon mixtures containing the same. A further object of my invention is to provide an olefin recovery process wherein the emulsion problem is substantially eliminated. A further object of my invention is to provide a new olefin absorption solution.

Other objects and advantages will be apparent to one skilled in the art upon reading the disclosure.

Broadly, the invention is based upon the discovery that the difficulties of emulsion formation ordinarily encountered can be substantially reduced or eliminated by the addition of a small amount of a detergent material of the group consisting of alkali metal salts of alkyl aryl sulfonates.

The absorbent solutions comprise heavy metal salts which are capable of forming the reversible complex with olefins, particularly desirable being the salts of the heavy metals of groups I and II of the periodic system, especially the metals of the right hand sub-group of group I. Examples of these metal salts include cuprous chloride, cuprous acetate, zinc bromide, cobaltous cyanide, silver chloride, etc. The present invention is directed to the use of these materials in acidic solutions wherein an ammonium salt is used, the ammonium salt corresponding to the anion of the copper salt. Generally, the acid used is that corresponding to the anion of the metal salt. Per liter of solution there are used from 1 to 10 mols, preferably 2 to 5 mols, of the metal salt; from 0.2 to 4, preferably 0.5 to 2, mols of ammonium salt and 0.03 to 0.6, preferably 0.1 to 0.4, equivalent weight of acid.

The detergents used in the solution are the alkali metal salts of alkyl aryl sulfonates. These materials are well known and are generally prepared by alkylating benzene or toluene with an alkyl group containing 8 to 18 carbon atoms, subsequently sulfonating, and then producing the alkali metal salt. Suitable examples include sodium octylbenzene sulfonate, potassium nonylbenzene sulfonate, lithium decylbenzene sulfonate, ammonium undecylbenzene sulfonate, sodium dodecylbenzene sulfonate, potassium heptadecylbenzene sulfonate, lithium octyldecyl benzene sulfonate, ammonium undecyltoluene sulfonate, sodium dodecyltoluene sulfonate, potassium tridecyltoluene sulfonate, lithium pentadecyltoluene sulfonate, ammonium dodecyltoluene sulfonate, sodium dodecyltoluene sulfonate, and sodium hexadecyltoluene sulfonate.

The amount of detergent used can vary from about 0.1 to 5 weight percent of the aqueous absorbent. Amounts greater than 5 percent can be used, but little or no advantage is obtained. A preferred range of detergent is from 0.5 to 3 weight percent.

*Example I*

A hydrocarbon mixture containing 0.5 mol percent isobutane, 3.5 mol percent n-butane, 26.2 mol percent 1-butene, 47.9 mol percent 2-butene and 21.9 mol percent butadiene was used.

The cuprous chloride absorbent solution used was made up of 400 grams cuprous chloride (26%), 1100 grams of water (72.1%), 20 grams of ammonium chloride (1.3%) and 20 ml. of 38% hydrochloric acid (0.6% HCl on water-free basis; the water is included in the figures given above).

To this slurry was added 40 grams of a commercial detergent, sodium dodecylbenzene sulfonate ("Vel"), to form the slurry composition used in this run.

A 300 ml. quantity of the hydrocarbon mixture was mixed with the slurry at 35° F. in a stirred glass vessel for 20 minutes. The stirrer was turned off and in 15 minutes a hydrocarbon phase 1⅝ inches deep had formed. At the end of 2 hours, the hydrocarbon phase was 2 inches deep. The hydrocarbon depth before reaction was 3⅜ inches.

The unsaturated hydrocarbons are easily removed from the aqueous phase following separation of this phase from the hydrocarbon phase.

*Example II*

A second run, substantially identical with Example I, was made, except that the detergent was omitted. After settling for 20 minutes, a hydrocarbon phase ½-inch deep had formed. On further standing, the hydrocarbon phase did not increase to any perceptible extent.

*Example III*

Example I was repeated, using "all," a synthetic detergent of unknown composition, "Aerofloc," a synthetic, water soluble polymer used to improve solid liquid separations by thickening and filtration, and "Separan 2610," a coagulant or flocculating agent, but no noticeable improvement in operation was noted with any of these materials.

From these examples, it appears evident that my invention is quite specific to the use of the particular type of synthetic detergent used in Example I.

As many possible embodiments can be made of this

I claim:

1. In the separation of olefins from fluid mixtures containing them with an acidic aqueous cuprous salt solution as the absorption medium, and wherein difficultly separable emulsions are formed, the improvement comprising having present in said aqueous cuprous salt solution 0.1 to 5 weight percent of a salt of an alkyl aryl sulfonate.

2. In the separation of olefins from fluid mixtures containing them with an acidic aqueous cuprous salt solution as the absorption medium, and wherein difficultly separable emulsions are formed, the improvement comprising having present in said aqueous cuprous salt solution 0.5 to 3 weight percent of a salt of an alkyl aryl sulfonate.

3. The process of claim 1 wherein said alkyl aryl sulfonate is selected from the group consisting of alkali metal and ammonium salts of alkyl benzene and toluene sulfonates wherein the alkyl group contains 8 to 18 carbon atoms.

4. The process of claim 1 wherein said sulfonate is sodium dodecylbenzene sulfonate.

5. An absorbent solution suitable for the recovery of olefins from hydrocarbon mixtures containing the same comprising, per liter of aqueous solution,

| | Mols |
|---|---|
| Copper salt | 1–10 |
| Ammonium salt | 0.2–4 | with from 0.03 to 0.6 equivalent weight of an acid and 0.1 to 5 weight percent of a salt of an alkyl aryl benzene sulfonate.

6. An absorbent solution suitable for the recovery of olefins from hydrocarbon mixtures containing the same comprising, per liter of solution,

| | Mols |
|---|---|
| Cuprous chloride | 1–10 |
| Ammonium chloride | 0.2–4 | with from 0.03 to 0.6 equivalent weight of hydrochloric acid and 0.1 to 5 weight percent sodium dodecylbenzene sulfonate.

7. An absorbent solution suitable for the recovery of olefins from hydrocarbon mixtures containing the same comprising, per liter of solution,

| | Mols |
|---|---|
| Cuprous chloride | 2–5 |
| Ammonium chloride | 0.5–2 | with from 0.1 to 0.4 equivalent weight of hydrochloric acid and 0.5 to 3 weight percent sodium dodecylbenzene sulfonate.

References Cited in the file of this patent

UNITED STATES PATENTS

| 2,411,105 | Nixon et al. | Nov. 12, 1946 |
| 2,497,150 | Carlson et al. | Feb. 14, 1950 |